(12) United States Patent
Verini

(10) Patent No.: US 10,288,398 B1
(45) Date of Patent: May 14, 2019

(54) NON-LETHAL SMART WEAPON WITH COMPUTER VISION

(71) Applicant: Nicholas A. Verini, Erie, CO (US)

(72) Inventor: Nicholas A. Verini, Erie, CO (US)

( * ) Notice: Subject to any disclaimer, the term of this patent is extended or adjusted under 35 U.S.C. 154(b) by 0 days.

(21) Appl. No.: 16/056,526

(22) Filed: Aug. 7, 2018

Related U.S. Application Data

(60) Provisional application No. 62/605,285, filed on Aug. 7, 2017.

(51) Int. Cl.
| | |
|---|---|
| *F42B 30/00* | (2006.01) |
| *F42B 10/14* | (2006.01) |
| *F42B 10/64* | (2006.01) |
| *F42B 10/50* | (2006.01) |
| *F41C 27/06* | (2006.01) |
| *G06K 9/00* | (2006.01) |
| *F42B 10/06* | (2006.01) |
| *F42B 5/145* | (2006.01) |

(52) U.S. Cl.
CPC ............ *F42B 30/006* (2013.01); *F41C 27/06* (2013.01); *F42B 5/145* (2013.01); *F42B 10/06* (2013.01); *F42B 10/14* (2013.01); *F42B 10/50* (2013.01); *F42B 10/64* (2013.01); *G06K 9/00369* (2013.01)

(58) Field of Classification Search
CPC ........ F42B 30/006; F42B 5/145; F42B 10/06; F42B 10/14; F42B 10/50; F42B 10/64; F41C 27/06; G06K 9/00369
USPC ....................................................... 235/404
See application file for complete search history.

(56) References Cited

U.S. PATENT DOCUMENTS

| | | | | |
|---|---|---|---|---|
| 3,962,537 | A * | 6/1976 | Kearns | F41G 3/14 348/144 |
| 10,118,696 | B1 * | 11/2018 | Hoffberg | B64C 39/001 |
| 2007/0086190 | A1 * | 4/2007 | Kukuk | F41C 23/10 362/253 |
| 2010/0198514 | A1 * | 8/2010 | Miralles | F41G 7/008 701/302 |
| 2014/0118554 | A1 * | 5/2014 | Bucknor | H04N 5/2251 348/155 |
| 2015/0316345 | A1 * | 11/2015 | Brahler, II | F41B 11/72 124/73 |
| 2017/0286762 | A1 * | 10/2017 | Rivera | G06K 9/00362 |

* cited by examiner

*Primary Examiner* — Daniel A Hess
(74) *Attorney, Agent, or Firm* — Patent Law Offices of Rick Martin, P.C.

(57) ABSTRACT

A non-lethal, non-impact smart projectile fired from a suitable launcher and equipped with a digital camera, CPU microprocessor and computer vision programming that can recognize a designated target and track a moving target, while moving at high speed. An image dataset of the target stored in memory of the CPU that enables the projectile to recognize a human or small UAV "drone" in real time within fractions of a second. A steering and braking system comprising several fins/air brakes, controlled by the CPU and MEMS micro-actuators, that enable the projectile to track a moving target or slow the projectile down. A projectile equipped with actuators that dispenses a non-lethal, non-impact payload or payloads as the projectile approaches the target.

20 Claims, 19 Drawing Sheets

FIG 2
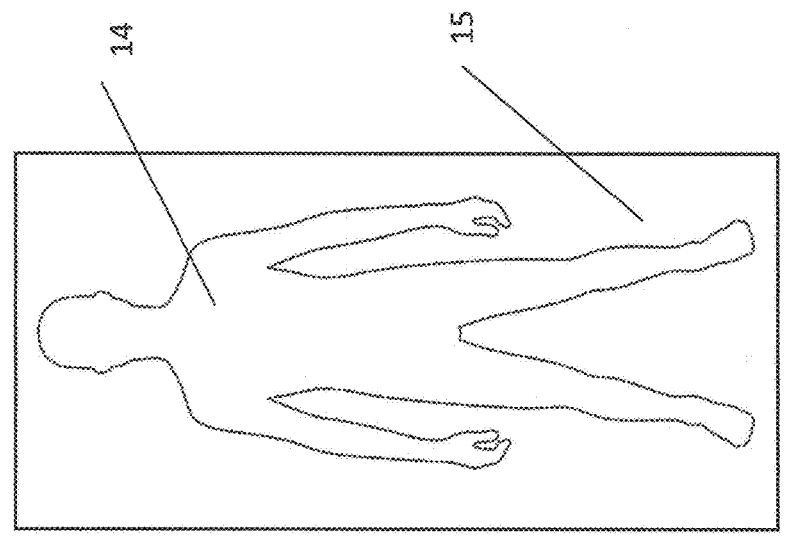
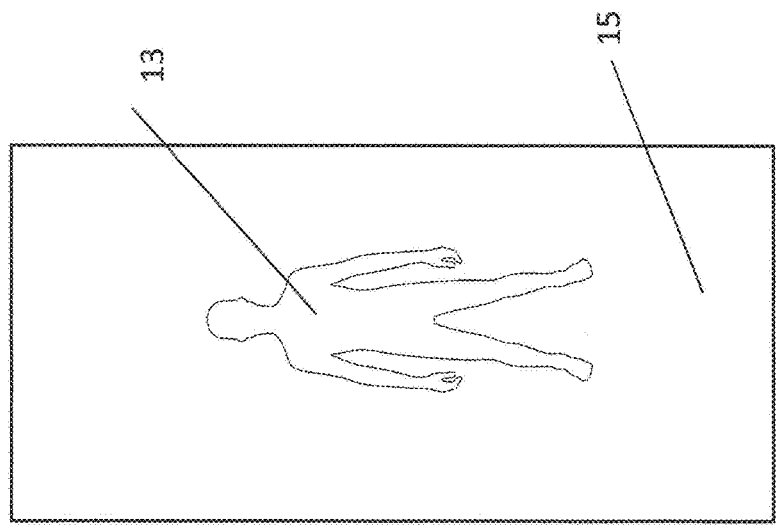

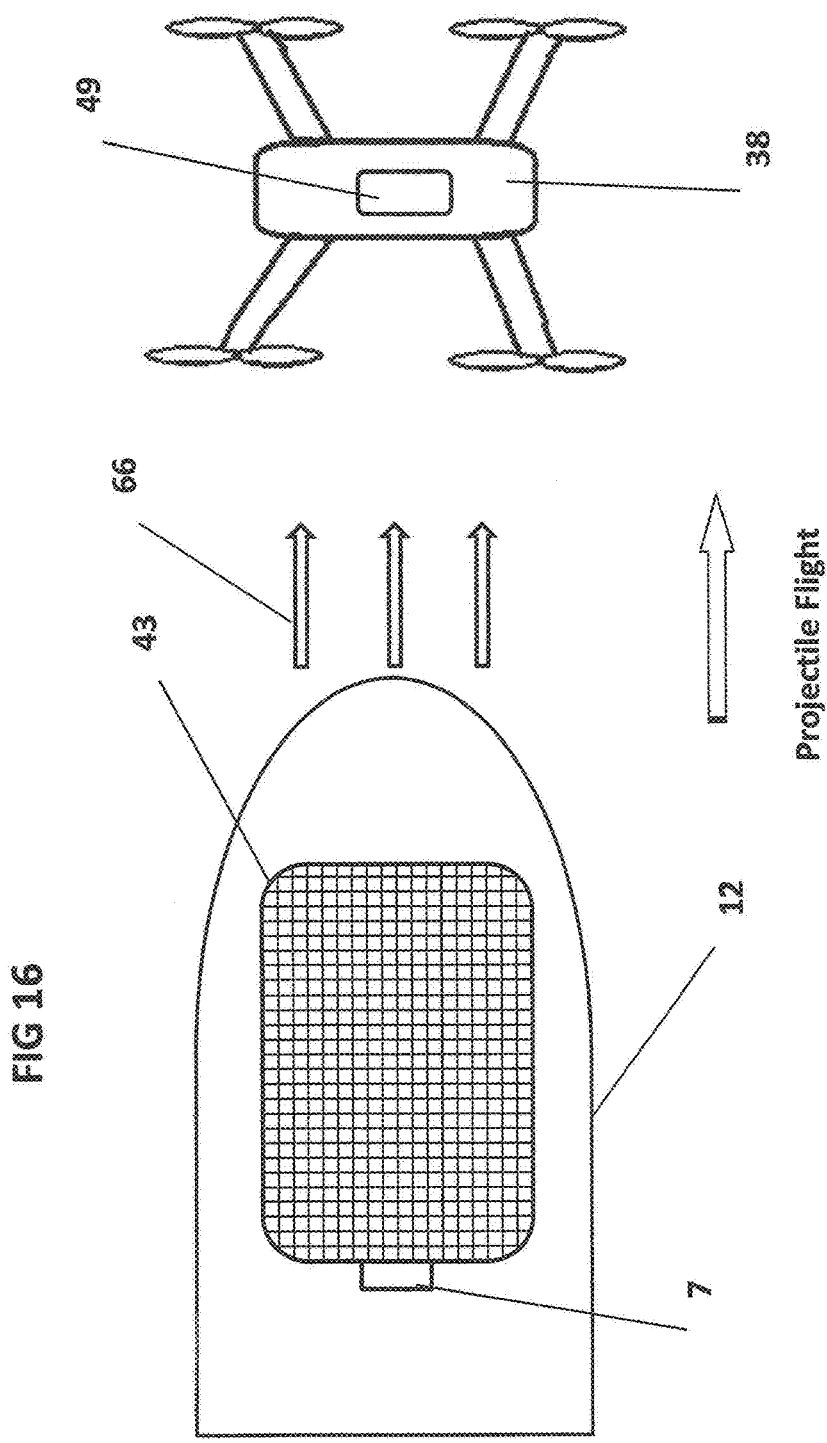

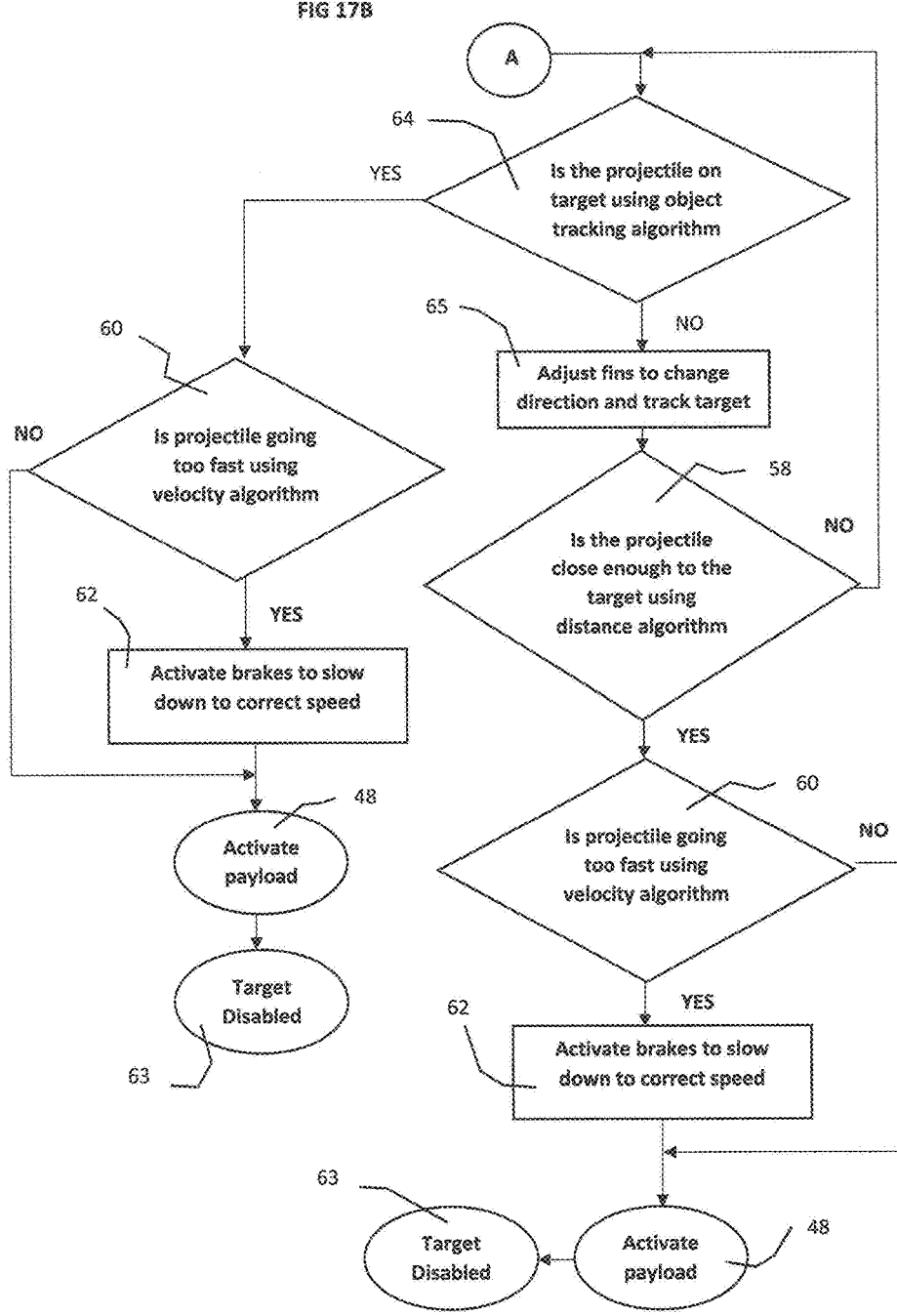

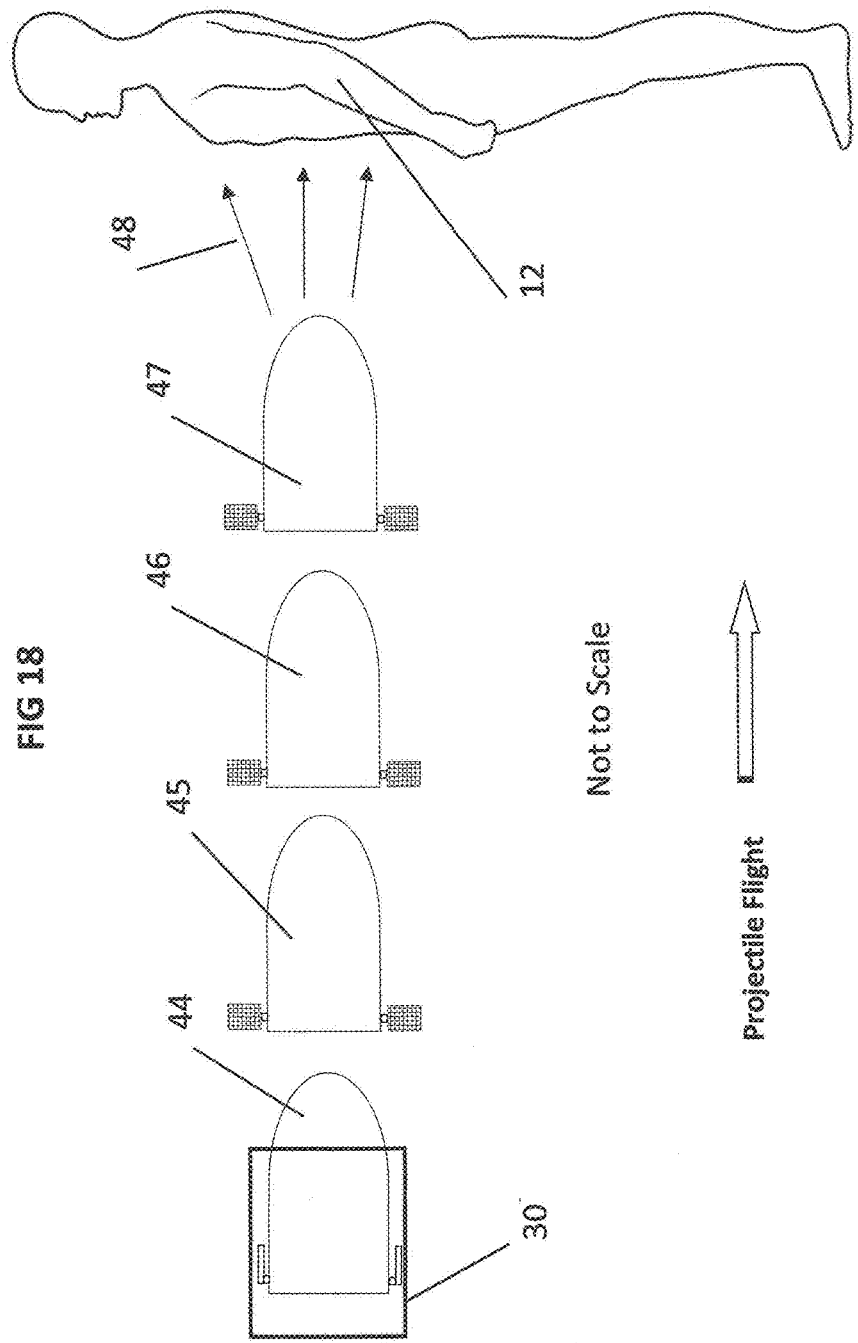

NON-LETHAL SMART WEAPON WITH COMPUTER VISION

CROSS REFERENCE APPLICATIONS

This application is a non-provisional application claiming the benefits of provisional application No. 62/605,285 filed Aug. 7, 2017 which is incorporated herein by reference in its entirety.

BACKGROUND

Due to the actual or perceived threat of violence today, firearms are more likely to be the weapon of choice for the public in situations where individuals believe that they must arm themselves in preparation for immediate retaliation or defense because of a threat of unknown force. Unfortunately, such firearms are typically weapons, such as rifles, semi-automatic handguns and revolvers, all of which are intended to fire lethal projectiles which are intended to maim and/or kill. While non-lethal projectiles do not have the deadly stopping power of a high velocity bullet fired from a firearm, such deadly force is generally not necessary to deter many typical crimes. Moreover, there are many situations where deadly force is either, not needed, wanted or even permitted by law. In fact, many states prohibit the use of deadly force unless one's own life or the lives of one's family are at stake. Many crimes do not involve this type of situation, such as burglaries, vandalism, robberies and the like where your own life is clearly not in danger. As a result, non-lethal weapons would very likely stop the crime in progress or at least provide a temporary time break, permitting one to flee in safety.

Non-lethal weapons make an excellent weapon for the Military to deal with individuals in a war zone when it may be difficult to distinguish who is the combatant and who is the innocent civilian. Non-lethal weapons are needed where conflict and disasters occur within population centers. Their use often would prevent the worsening of bad situations. Non-lethal weapons like blunt-impact rounds, pepper rounds and others stopped and/or dispersed noncombatants who posed a threat to forces in Kosovo, Iraq, Haiti and Afghanistan. They also helped determine the intentions of operators of small boats that were nearing U.S. Navy and Coast Guard vessels.

For Law Enforcement non-lethal weapons are designed to fill a critical gap in the use of force and to provide law enforcement officers the safest, most effective tools in a variety of applications. These weapons help officers gain control of the suspect's fear, encouraging them to surrender, de-escalating the situation and reducing the number of use-of-force incidents. In a riot situation law enforcement officers armed with non-lethal weapons indicates to the crowd that law enforcement is here to keep the peace but is not here to use unnecessary force or escalate the situation. Organized protesters are communicating via mobile phones and can bring together large numbers of likeminded people. This is putting tremendous pressure on law enforcement officers to deal with large hostile crowds without seriously injuring the protesters.

What is needed in the art is a non-lethal projectile that does not hit the target, but instead, sends a gas or the like into the target, disabling the target, and then self-destructs.

SUMMARY OF THE INVENTION

The present invention is a non-impact, non-lethal smart projectile that will give Military, Law Enforcement, Corrections, Security firms, Border Patrol, and even private citizens a safe and effective self-defense and crowd/riot control weapon. These smart bullets are designed to offer an alternative to small caliber weapons but with sufficient stopping power to disable an assailant or combatant. These active projectiles are designed to be fired from standard 12-gauge shotguns, custom 18 mm compressed gas launchers, or standard 40 mm grenade launchers. This invention consists of non-impact, non-lethal, active ammunition that is controlled by real time computer vision that computes; distance, velocity and motion. This computer vision called SmartVision comprises a digital camera, microprocessor CPU/GPU, micro-actuators, and programming code and algorithms, and is capable of object recognizing and object tracking a target. These are active ammunition—"smart bullets"—that incorporates new micro-electro-mechanical systems MEMS, digital image technology and computer vision that provides powerful stopping power without impacting the target and causing serious injury. Both the micro-sensors and the micro-controller are small, inexpensive, robust and reliable, solid-state, programmable devices. These "fire and forget" smart rounds are suitable for extreme weather conditions, and capable of long range.

The invention comprises a bullet shaped projectile body, CPU microprocessor, accelerometer, fins/air brakes, digital camera, micro-actuators, battery/capacitor, and various payloads. The CPU and digital camera along with open source OpenCV programing and the projectile's object recognition, object tracking, velocity and distance measuring algorithms determines that the smart bullet is close to the target and activates the payload millisecs before it reaches the target utilizing air burst technology.

These smart bullets will revolutionize the munitions industry and will pave the way for replacing lethal weapons in those situations where deadly force is not needed or wanted. This will represent a paradigm shift for law enforcement from lethal/less-lethal to truly non-lethal weapons. These non-lethal smart bullets make an excellent weapon for the military to deal with individuals in a war zone when it may be difficult to distinguish who is the combatant and who is the innocent civilian.

There are several payloads (non-explosive and explosive) that are possible. They include but are not limited to the following: compressed gas, liquefied gas, electroshock generator, electro-magnetic waves, acoustic generator, light waves, hyperbaric propellant, explosive, chemical irritant, malodorant, liquid, powder, solid, gel, aerogel, expanding foam, electrodes, and drug.

The choice and size of the payload(s) is determined by the needs of the user. The six preferred versions of this invention are; ShockRound, PepperRound, HemiRound, FlashRound, RepelRound, and SoundRound. The ShockRound uses a primary hyperbaric propellant payload to produce a powerful shock wave that disables the assailant. The PepperRound uses two payloads, a primary and a secondary payload that produce a milder shock wave that disperses a chemical irritant such as capsaicin that disables the assailant. The HemiRound uses an electroshock generator to deliver a high voltage electrical shock via electrodes that disables the assailant. The FlashRound is a non-pyrotechnic flash-bang projectile that uses intense sound and light to disable the assailant. The RepelRound utilizes a malodorant payload that deters the assailant or assailants. The SoundRound is an acoustic projectile that uses an acoustic generator and produces a loud, piercing, high-frequency steady or pulsed sound that deters or disables the assailant.

Non-lethal weapons are needed where conflict and disasters occur within population centers. They fill the space between "shouting and shooting" and their use often has prevented the worsening of bad situations. This invention along with standard 12-gauge shotguns or other launchers are designed to fill a critical gap in the use of force and to provide law enforcement officers the safest, most effective tools in a variety of applications. These weapons help officers gain control of the suspect's fear, encouraging them to surrender, de-escalating the situation and reducing the number of use-of-force incidents. It also gives the law enforcement officer a choice depending on the situation. He or she can use deadly force if necessary, or effective non-lethal force if the situation permits. In a riot situation law enforcement officers armed with this invention and launchers indicates to the crowd that law enforcement is here to keep the peace but is not here to use unnecessary force or escalate the situation.

The DoD Non-Lethal Weapons Program, Human Effects Office, manages a portfolio of science and technology efforts to understand the relevant human impacts of emerging technologies in terms of their effectiveness and risk. Examples of such efforts include examining novel stimuli for applicable effects, determining stimuli doses for achieving those effects, and developing a framework for assessing behavioral effectiveness. The results of these efforts establish the human impacts of these technologies in terms of their effectiveness and risks and contribute to the development of models and surrogates for testing. Robust engagement between material and combat developers, testers and human effects personnel ensures integration of technology development, human effects and test and evaluation plans and investment strategies-managing cost, schedule and technical risk due to human effects characterization. Through experimentation technicians at the DoD generate data on the amount of non-lethal stimulus necessary to be effective yet minimize the risk of significant injury. Technicians then use this information to develop or refine non-lethal human effects models. Technicians and medical staff validate and verify the Human Effects Modeling Analysis Program they have developed to ensure the components are generating accurate and consistent predictions.

BRIEF DESCRIPTION OF THE DRAWINGS

FIG. 2 shows the camera image of the human target at a distance and close-up, both within a fixed field of view.

FIG. 16 shows the radio frequency RF generator payload used for disrupting the signal received by a UAV or drone from the drone's operator.

FIGS. 17A and 17B show the process flow and actions of the smart projectile operation.

FIG. 18 shows the projectile leaving the barrel and the flight timeline phases until the projectile reaches the target and activates the payload.

Other aspects of this invention will appear from the following description and appended claims, reference being made to the accompanying drawings forming a part of this specification wherein like reference characters designate corresponding parts in the several views.

Figure 1:
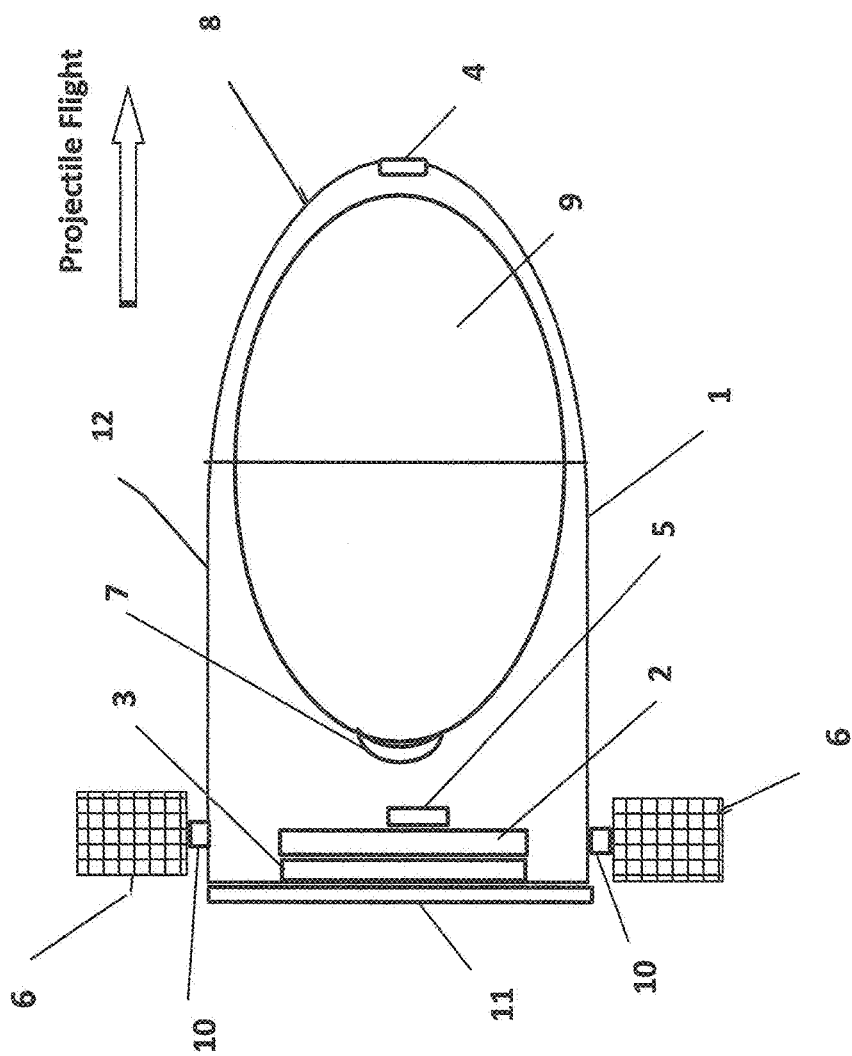
FIG. 1 shows a cut away of the smart projectile body indicating the main components including the CPU, camera, accelerometer, battery/capacitor, actuators and payload.

These and other features and advantages of the non-lethal projectile reside in the construction of parts and the combination thereof, the mode of operation and use, as will become more apparent from the following description, reference being made to the accompanying drawings that that form a part of this specification wherein like reference characters designate corresponding parts in the several views. The embodiments and features thereof are described and illustrated in conjunction with systems, tools and methods which are meant to exemplify and to illustrate, not being limiting in scope.

DESCRIPTION OF THE PREFERRED EMBODIMENTS

Figure 14:
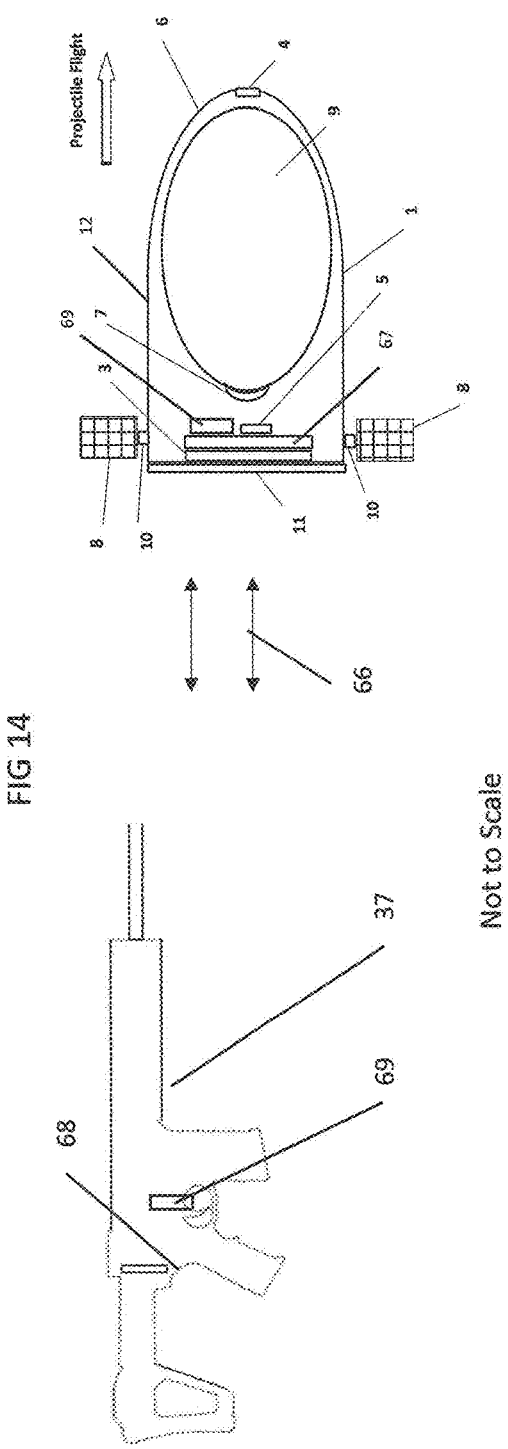
FIG. 14 shows a maximum power CPU located in the launcher and the launcher and projectile communicating data between them via RF signals.

FIG. 14 a non-lethal, non-impact smart projectile 12 fired from a suitable launcher 37 that can recognize a target at a distance and track the target until it gets close to the target. The projectile then releases its non-lethal payload 9 and disables the target without causing serious injury. The target can be a human 71 as in FIG. 10 or an unmanned aerial vehicle "drone" 38 as in FIG. 15. The projectile comprises a 18 mm or 40 mm diameter plastic or carbon fiber projectile body 1, see FIG. 1, central processing unit CPU 2, forward facing digital camera 4, lithium ion or polymer battery/capacitor 3, MEMS based accelerometer 5, micro-actuators 10, fins/air brakes 6 and a non-lethal payload 9 or payloads 9, 16. The CPU 2 is programmed with open source OpenCV real time computer vision algorithms including object recognition and object tracking algorithms. These algorithms in combination with the digital camera 4 allow the smart projectile to determine if the projectile has a human image 71 or UAV "drone" image 38 in its field of view. The CPU 2 contains a high-speed graphics processing unit GPU component to speed up the computer vision and the object recognition and object tracking algorithms. The custom image dataset 56 programmed into the CPU memory contains thousands of images of humans or UAVs, and it is this dataset that the object recognition and object tracking algorithms reference for matching to the real time digital camera image.

Figure 11:
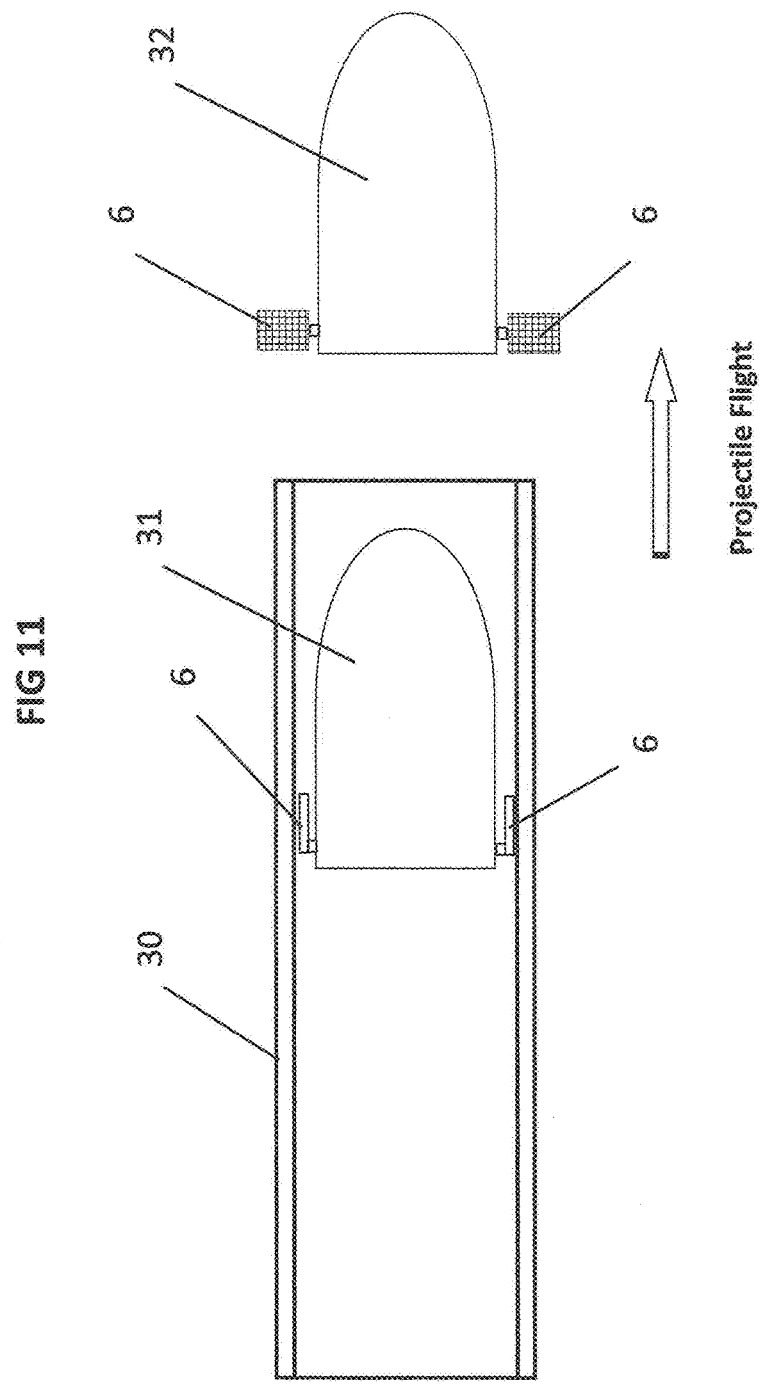
FIG. 11 shows the projectile in a barrel before firing, and with the fins/air brakes closed, and then leaving the barrel with the fins/air brakes open.

In FIG. 11 the projectile 31 when inside the barrel of the launcher 30 has its fins/air brakes 6 in a closed position and the CPU 2 is powered off. When the projectile 12 is fired the accelerometer 5 senses rapid acceleration and turns the CPU 2 on. The fins/air brakes 6 open automatically due to the air flow around them when they leave the barrel 30, see item 32. The camera 4 turns on and immediately looks to recognize the designated target in its fixed field of view using the object recognition algorithm. The OpenCV computer vision algorithm determines if the image is a designated target by searching the image dataset 56 contained in the memory of the CPU 2. If the camera 4 does not detect the designated image in the first few millisecs after launching then the air brake actuators 10 rotate the fins/air brakes 6 90 degrees from their initial position to slow the projectile 12 down, and the projectile 12 powers down, see FIG. 7. If the object recognition algorithm and digital camera 4 do detect the designated target within several millisecs the CPU 2 then uses object tracking algorithm and the distance measuring algorithm to determine if the target has moved and how close the projectile 12 is to the target 38,71. The object tracking algorithm tracks the target and if the target has moved off center in the camera field of view the CPU 2 activates the fin actuators 10 to rotate the fins/air brakes 6 and steer the projectile 12 to the target 38,71 using the four projectile fins/air brakes 6.

Figure 3:
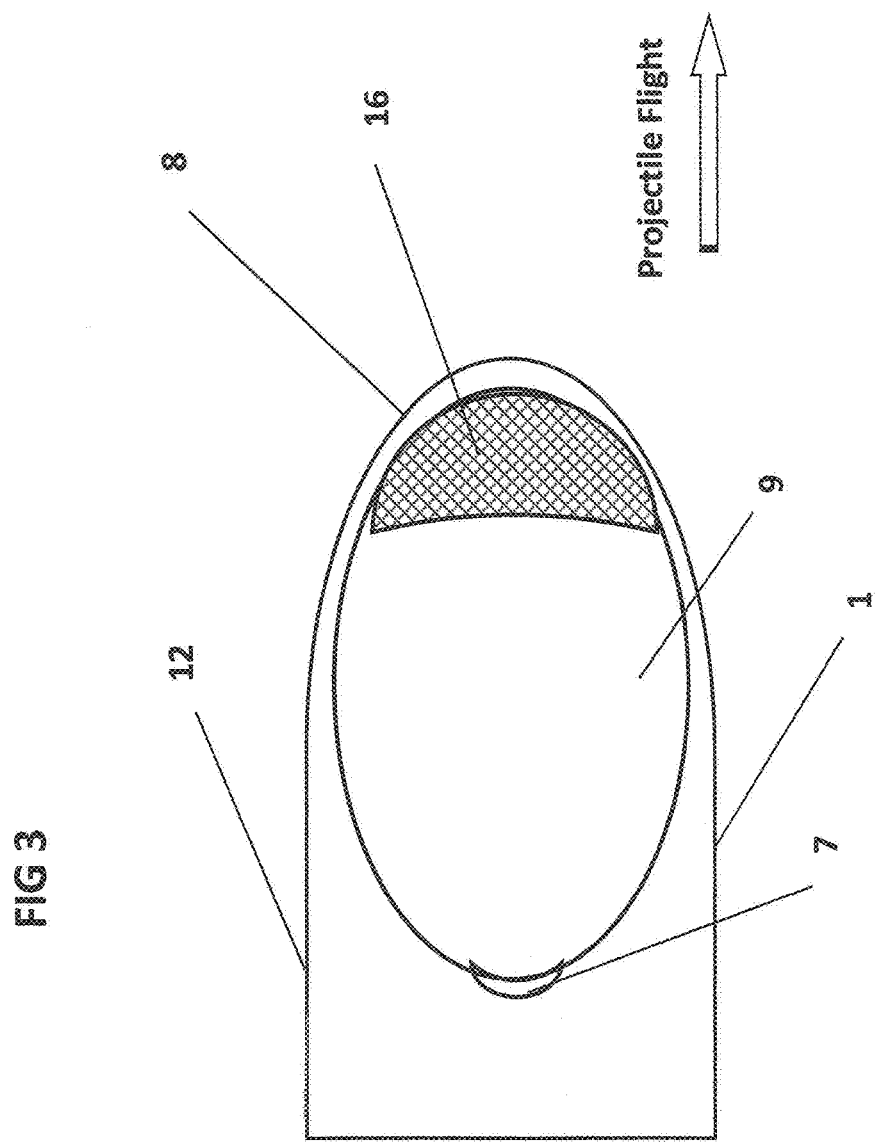
FIG. 3 shows a secondary payload in front of the primary payload that disperses a chemical irritant such as capsaicin that disables the target.
Figure 4:
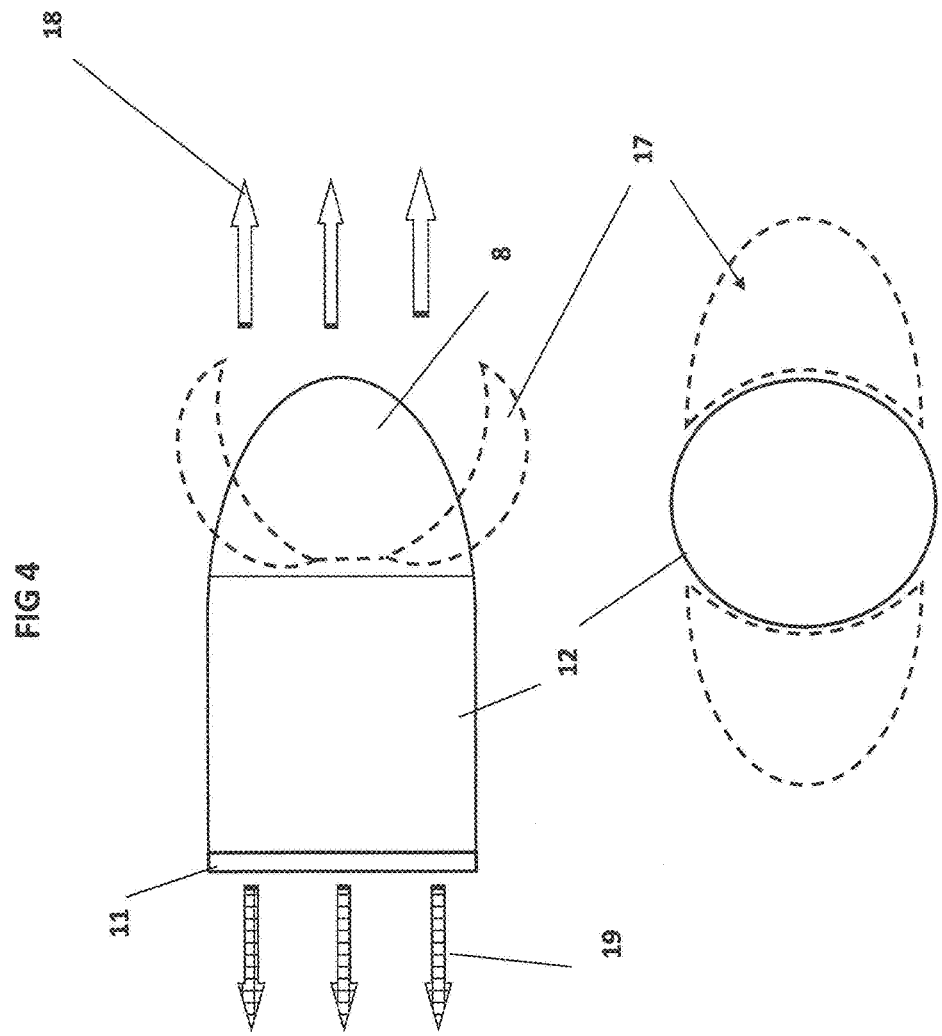
FIG. 4 shows the front head of the projectile bursting open to release its payload, and the opposing thrust vector acting on the projectile body.
Figure 6:
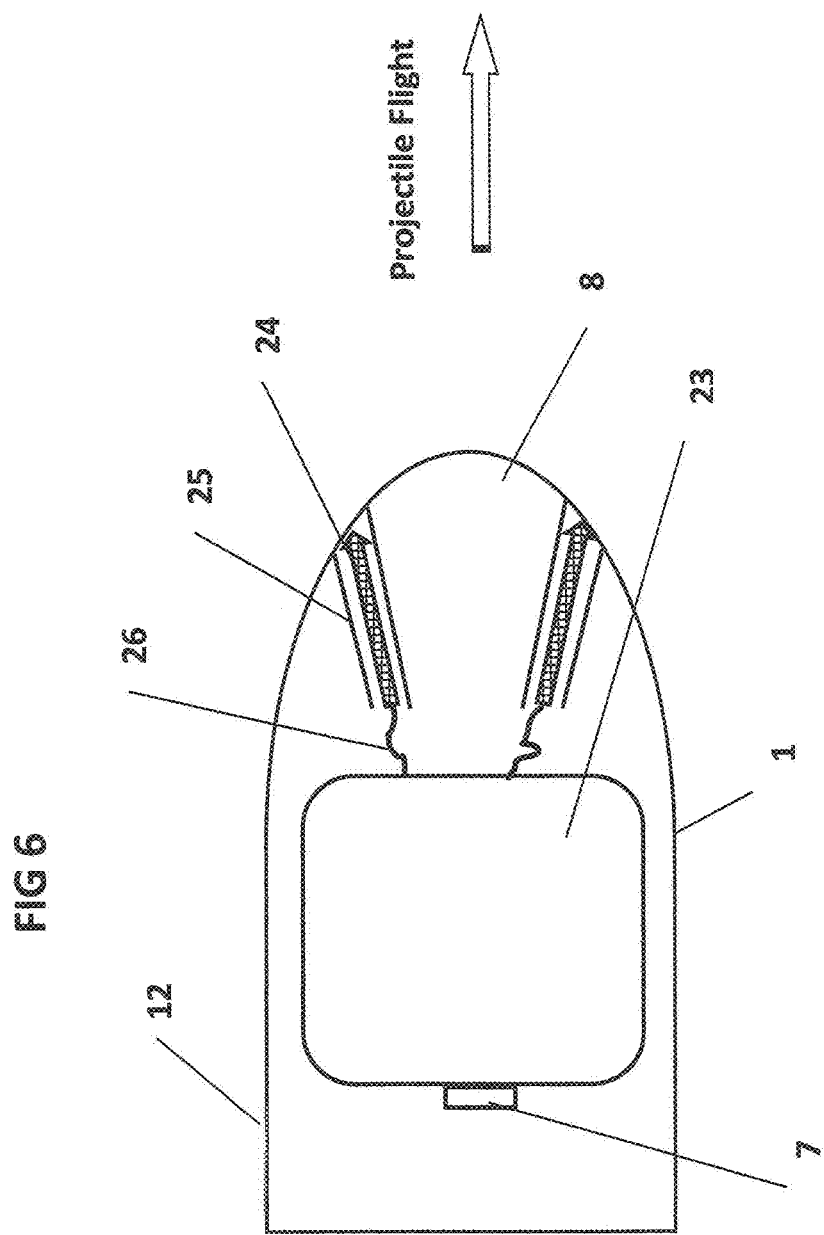
FIG. 6 shows the electroshock generator payload and the two electrodes that deliver a high voltage electrical shock that disables the target.
Figure 7:
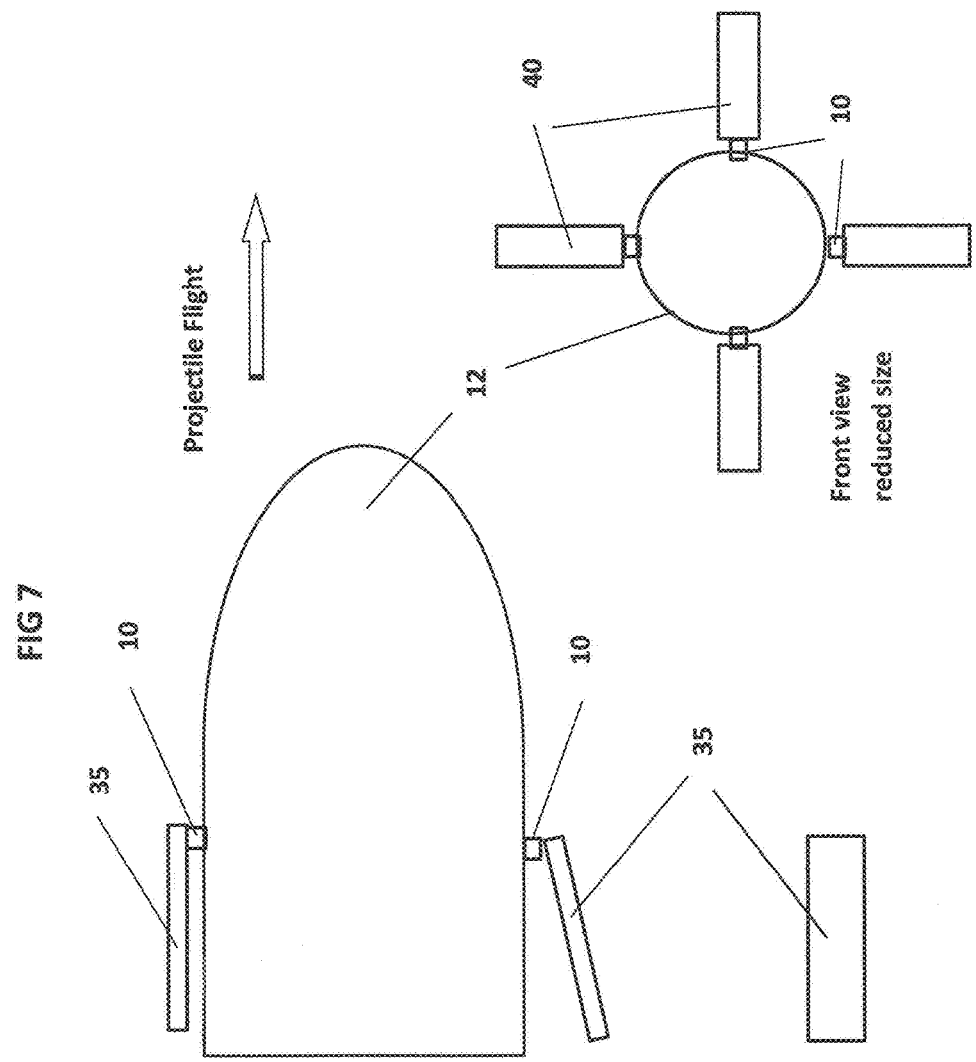
FIG. 7 shows the rotating flat plate fins/air brakes used to steer or slow down the projectile.
Figure 8:
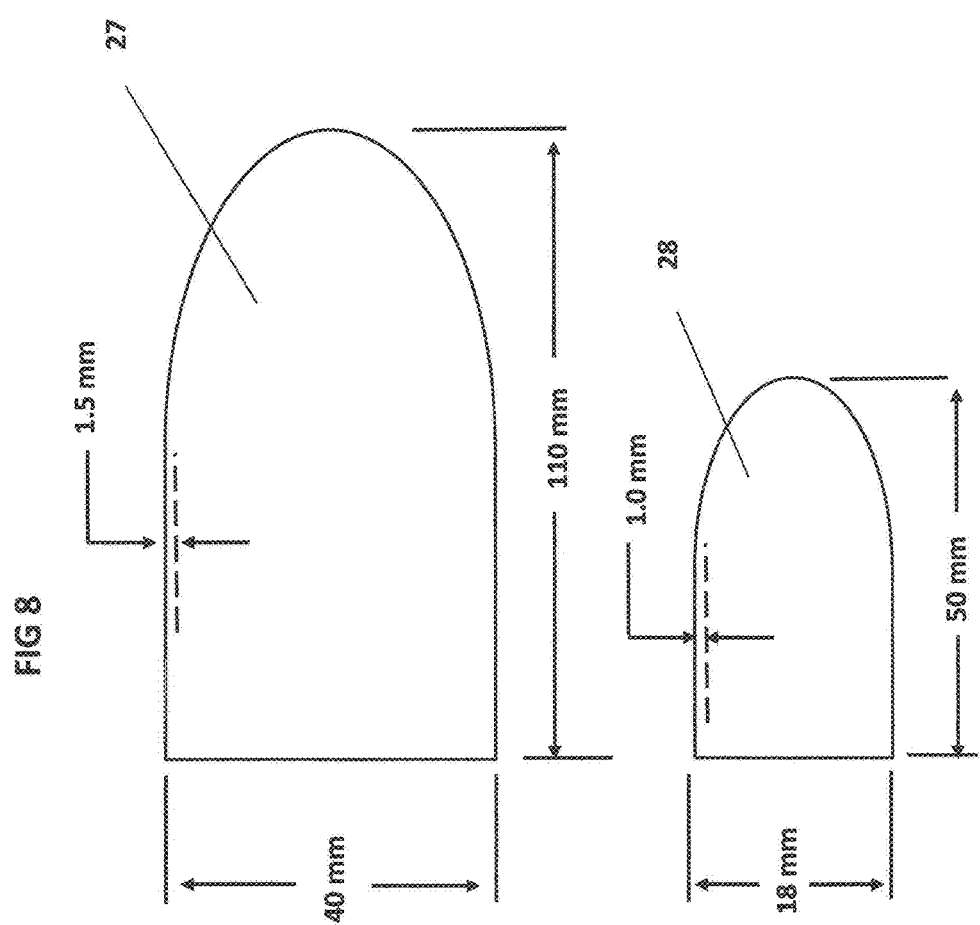
FIG. 8 shows the 18 mm and the 40 mm projectiles with dimensions.
Figure 9:
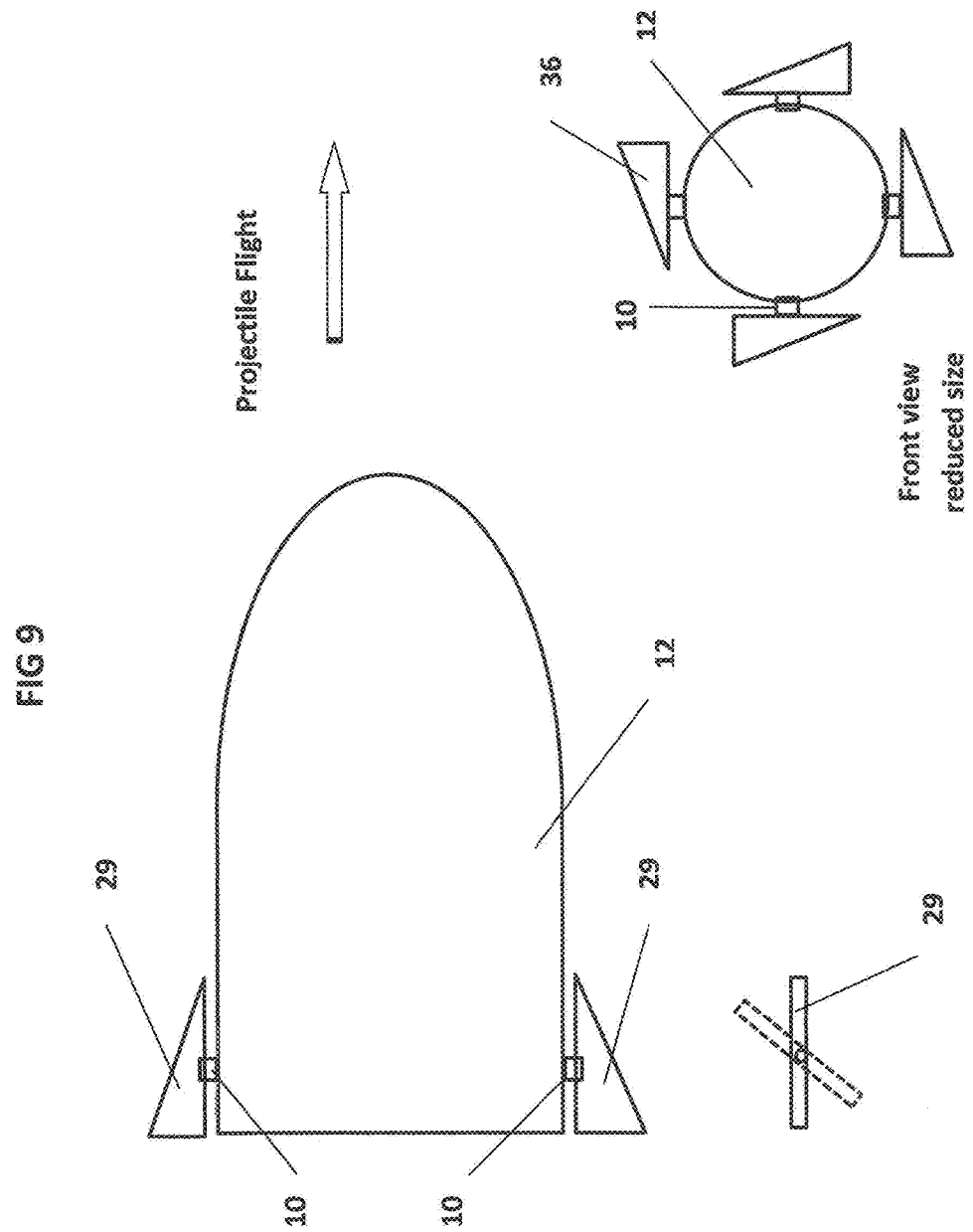
FIG. 9 shows the rotating triangular fins/air/brakes used to steer or slow down the projectile.
Figure 10:
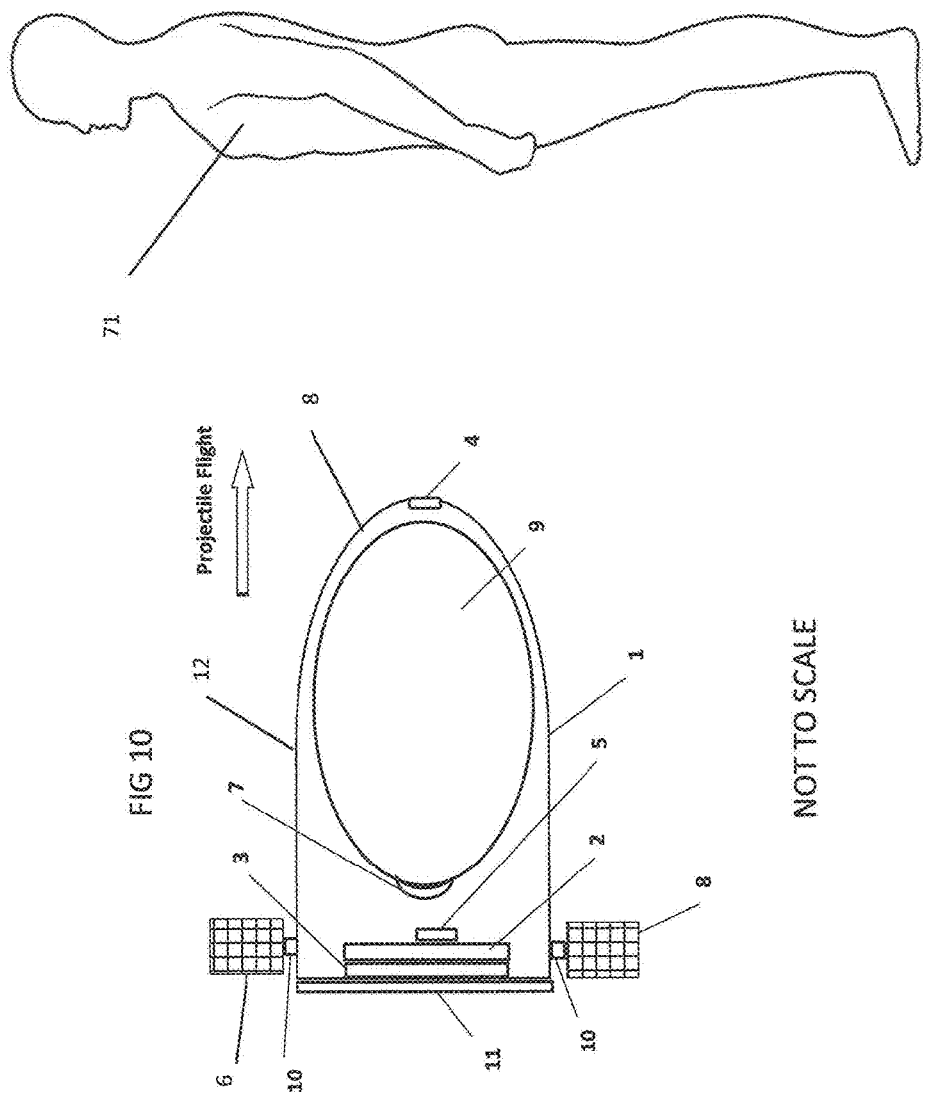
FIG. 10 shows the smart bullet approaching a human target.
Figure 12:
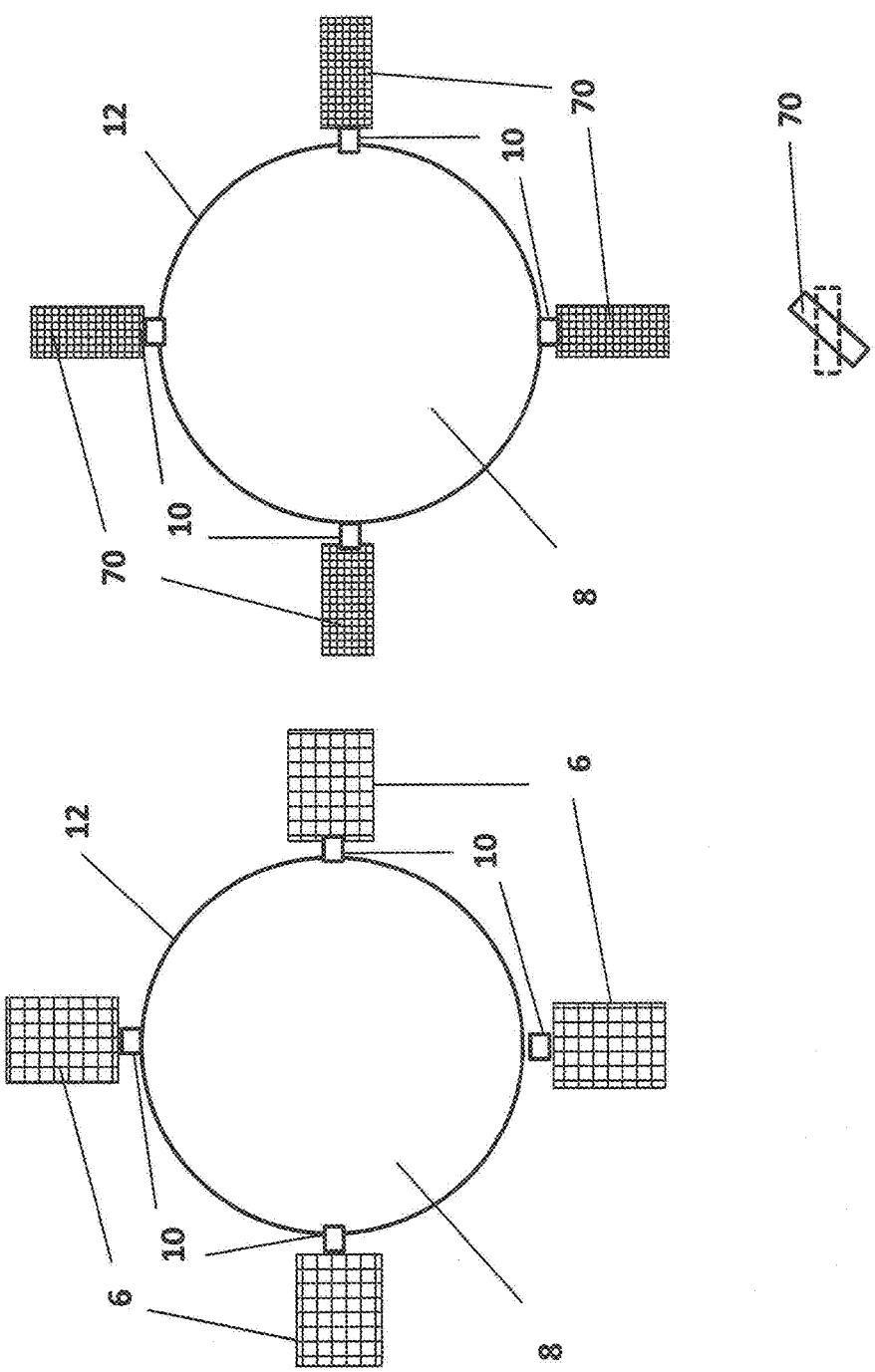
FIG. 12 shows the rotating grid shaped fins/air brakes in the steering and braking positions.
Figure 13:
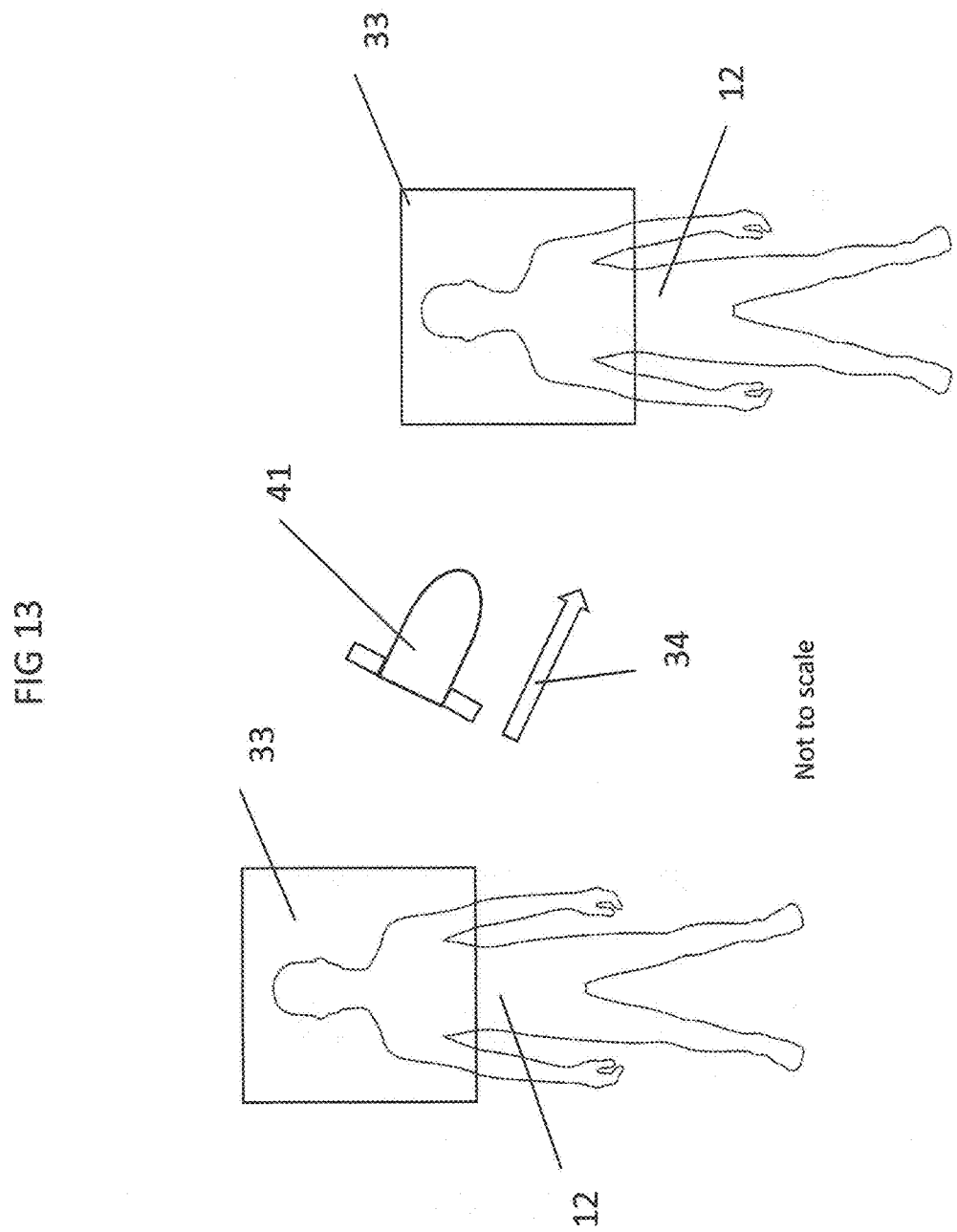
FIG. 13 shows the human being recognized and then tracked by the projectile as it moves.

The distance measuring algorithm in FIG. 2 uses the camera's fixed field of view 15 and the target image pixel area 13, 14 in relationship to the total field of view pixel area 15 to determine the distance from the projectile to the target. When the projectile reaches a distance from the target corresponding to the target image pixel area of approximately 50%, 14 over 15 of the total field of view area, the velocity measuring algorithm then determines the approaching velocity of the projectile to the target. The velocity measuring algorithm uses the change in the target image pixel area versus the total field of view pixel area over a time period. If the projectile is approaching the target too fast the CPU signals the air brake actuators to rotate the fins/air brakes and increase their drag coefficient to slow the projectile down to the correct speed. The object tracking algorithm and the distance measuring algorithm continue to be active and adjust the fins/air brakes as needed. When all three measurements: distance, velocity and "on target" are within the desired parameters the payload actuator then activates the payload 9. A target image pixel area of approximately 80% of the total field of view area corresponds to the projectile being the correct distance from the target. Even though the projectile is moving toward the target at close proximity the resulting reverse thrust vector 19 due to the bursting of the payload 17, 18, see FIG. 4 slows the projectile enough to not strike the target. The four fins/air brakes can rotate individually and can steer the projectile and slow the projectile simultaneously. The payload or payloads, in the case of a projectile that has a secondary payload 16, see FIG. 3, are released by action of the payload actuator when the payload actuator receives a signal from the CPU to release the payload. The 18 mm projectiles 28 are sized and designed to be fired from a standard 12-gauge shotgun or custom 18 mm gas launcher at 200-400 feet per second and have a range of 50 to 300 feet. The 40 mm projectiles 27 are sized to be fired from 40 mm grenade launchers such as the M320 or M230 military grenade launchers at 200-600 feet per second and have a range of 50-1500 feet. The projectiles do not spin in flight but are stable due to the proper location of the center of gravity and center of pressure. FIG. 6 shows the electroshock generator payload 23 within the housing with the two electrodes 24 and connecting wires 26. FIG. 7 shows the flat plate fins/air brakes folded 35 and rotated 90 degrees 40. FIG. 8 shows dimensions for the 40 mm 27 and 18 mm 28 projectiles. FIG. 9 shows the triangular fins/air brakes 29 in the steering position and in the braking position 36. FIG. 10 shows the projectile 12 flying toward the human target 71. FIG. 11 shows the projectile inside the launcher barrel 30 and outside the barrel 32 after being fired. FIG. 12 shows the projectile equipped with grid fins/air brakes 6 in the steering position and in the braking position of 45 degrees 70. FIG. 13 shows the object recognition and tracking window 33 along with the projectile tracking the target 41 and the projectile tracking motion 34.

This invention uses an accelerometer and actuators based on a micro-electro-mechanical systems (MEMS) design. The accelerometer is used for dynamic monitoring of rapid acceleration when the projectile is fired. MEMS (micro-electro-mechanical systems) technology builds on the core fabrication infrastructure developed for silicon integrated circuits. Micromechanical structures are created by etching defined patterns on a silicon substrate to form sensor elements or mechanical actuators that can move fractions of a micron or more. The digital camera is a device that converts an optical image into an electronic signal. Most digital cameras are active pixel sensors incorporating complementary metal-oxide-semiconductor (CMOS) technologies. A CMOS imaging chip is a type of active pixel sensor made using the CMOS semiconductor process. Extra circuitry next to each photo sensor converts the light energy to a voltage. Additional circuitry on the chip may be included to convert the voltage to digital data. The projectile microcontroller is a solid-state, fast, low cost CPU that also contains GPU capability for faster image processing. It is a programmable chip that contains the computer vision algorithms and receives signals from the camera. This invention uses an ultra-capacitor/lithium battery to store the electrical charge for each smart projectile. The battery can be either lithium ion or lithium polymer. The lithium polymer battery and the ultra-capacitor can also be electrically charged while the projectile is in the launcher. The electrical power stored is used to power the digital camera, CPU and the micro-actuators. The smaller 18 mm diameter projectile 28 is sized to fit a custom compressed gas launcher chamber, or a 12-gauge shotgun shell. The larger 40 mm diameter projectile 27 is sized to fit inside a 40 mm grenade launcher. Thin wall (1.0-1.5 mm) carbon fiber is the preferred material for the outer body 1 because it is light, strong and can handle the heat and contain the hyperbaric pressure from the release of the payload. The front head 8 of the projectile is made of polystyrene (1.0-1.5 mm). Polystyrene is clear, so that the digital camera can see the target clearly and is also frangible so that the payload pressure is released forward. The back-plate 11 helps to contain the high pressure from expanding backward. The total weight of the smart projectile is approximately 25-50 grams. The overall length varies from 55 mm to 110 mm depending on the diameter of the projectile. This invention has numerous payloads that are possible. They include but are not limited to the following: compressed gas, liquefied gas, electroshock generator 23, laser, acoustic generator 20, sound waves 22, hyperbaric propellant, explosive, flash-bang powder, chemical irritant, malodorant, liquid, powder, solid, gel, aerogel, expanding foam, radio frequency generator 43, netting 42, and drug.

Figure 5:
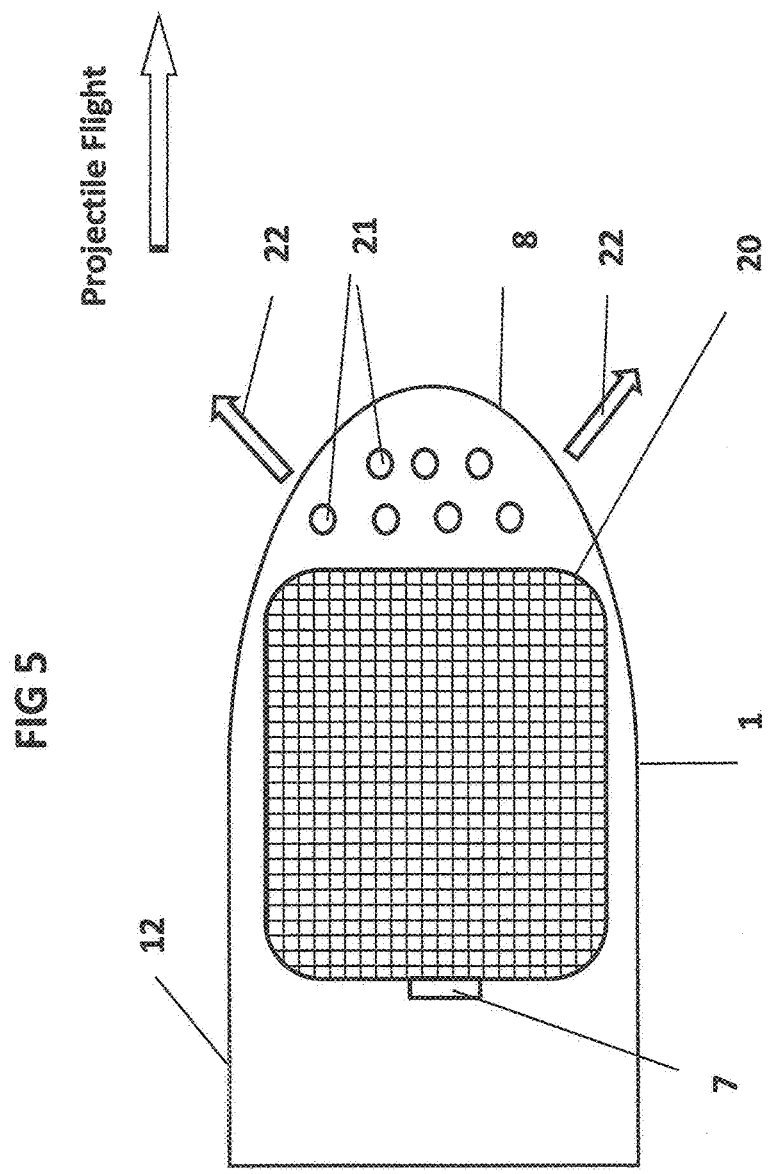
FIG. 5 shows the acoustic generator payload that produces loud, piercing, high-frequency steady or pulsed sound waves that deters or disables the target.
Figure 15:
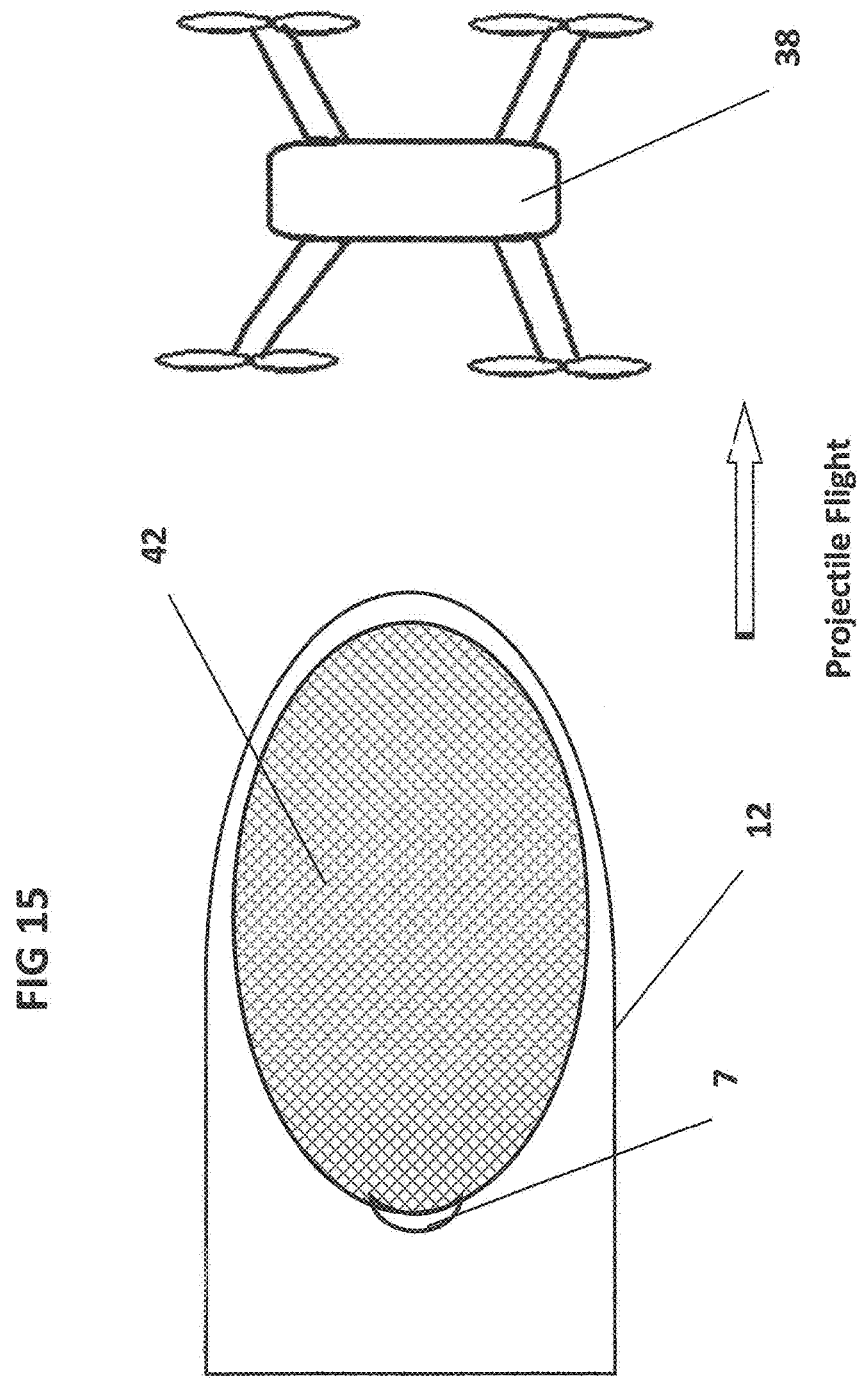
FIG. 15 shows the netting payload used for entangling the props of a small drone.
Figure 17A:
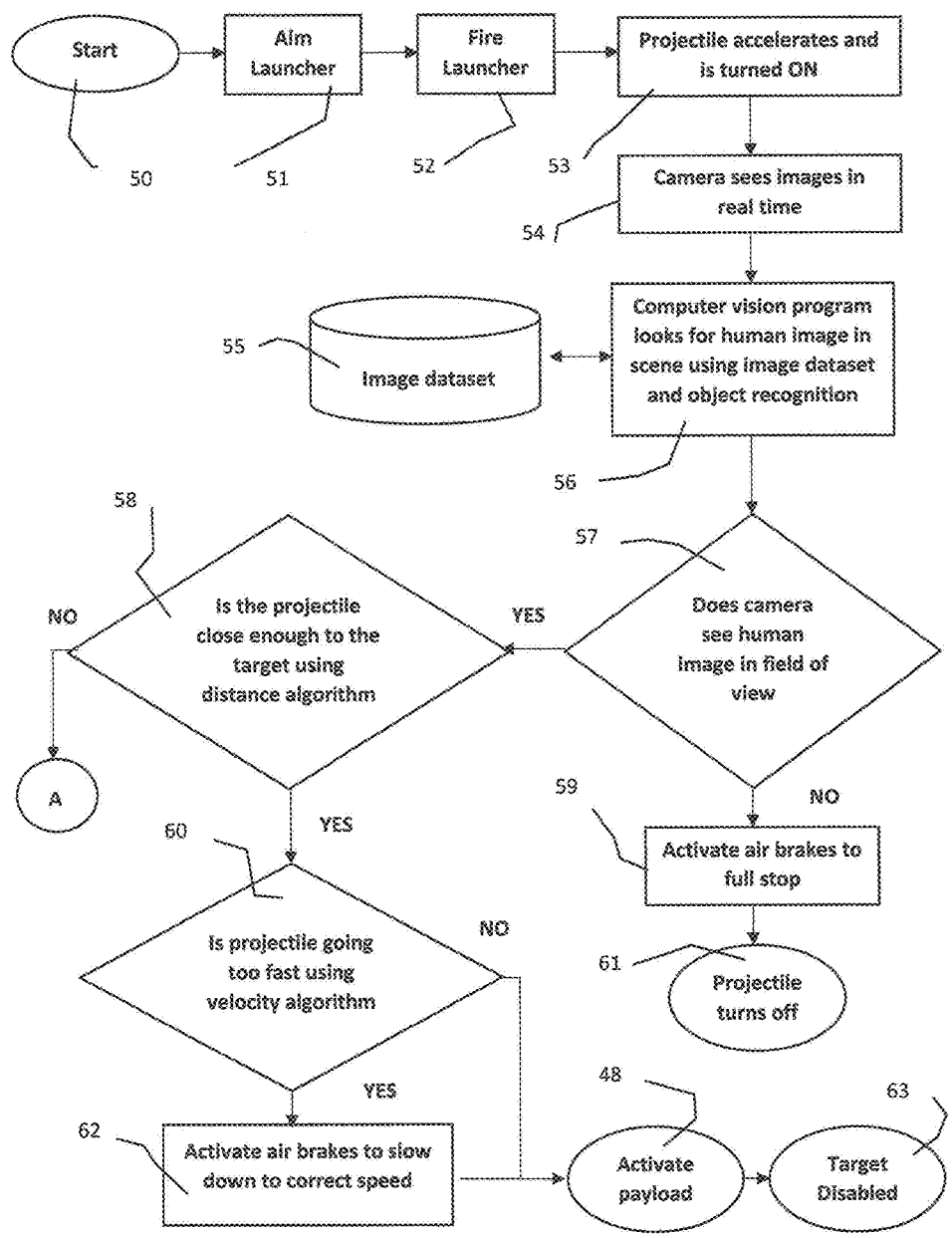

The acoustic generator FIG. 5 sends sound waves 22 thru ports in the front head. If the round is equipped with a secondary payload 16, such as a chemical irritant, the primary payload explosion breaks open the secondary payload and disperses the secondary payload forward toward the target, disabling the target. Even though the projectile is moving toward the target at a certain velocity the resulting reverse thrust vector 19 keeps the projectile from hitting the target. The back plate 11 needs to cover at least a portion of the back of the projectile in order to contain the reverse thrust vector. The payload actuator receives a trigger signal from the CPU micro-controller that the target is close and activates the payload. The payload actuators are of two types, ON/OFF or variable motion (linear or rotational) and can be mechanical or electrical depending on the nature of the payload. In the case of an explosive or flash bang payload, it can act as a primer. In the case of certain payloads, it can be the MEMS device itself. This invention uses a combination of the proper center of gravity and center of pressure locations in its design, and four rear mounted fins/air brakes for stability and accuracy. The fins/air brakes (90 degrees apart) can adjust the trajectory of the projectile by individually rotating up to 90 degrees and changing the drag coefficient of the individual fin/air brake. The four fins/air brakes can adjust the flight of the projectile to track the target. For steering one or more fins/air brakes can rotate up to 90 degrees to change the air flow or drag coefficient of the individual fins/air brakes and steer the projectile (left, right, up, down). For braking the individual fins/air brakes rotate up to 90 degrees to change their drag coefficient to slow the projectile down. The fins/air brakes are folded down in the barrel and open-up when the round is fired. The fins/air brakes can also slow down the projectile to approximately 50 feet per second from 400 feet per second, as an example to deploy electro-muscular incapacitation electrodes 24. The slower velocity also helps to disperse the various payloads more effectively and over a wider area. The projectile does not rotate but remains steady throughout its entire flight. Three different fin/air brake designs have been selected to accomplish this steering and braking. The grid or waffle shaped design 6 is compact and contains a large airfoil surface area for its overall size. It is a good choice when there is an overall volume constraint such as when the 18 mm projectile is packaged into a 12-gauge shotgun shell. The triangular fin/air brake design 29 is a more conventional shaped airfoil and is the more effective for the steering function. The flat plate fin/air brake design 35 is a good choice for the braking function. The choice of which fin/air brake design to use depends on the size of the projectile, 18 mm versus 40 mm, and the projectile payload. These three different fin/air brake airfoils can be used in any combination or as the sole method of steering and braking. FIG. 14 shows in the case that insufficient CPU processing power can be fitted into the smaller 18 mm smart projectile for quick enough reaction times for object tracking, distance measuring or velocity control, a CPU with maximum processing power can be fitted into the launcher. This maximum power CPU 68 is programmed with the OpenCV computer vision algorithms along with the image dataset 56 and object recognition, object tracking and distance and velocity algorithms. A small capacity CPU 67 is then fitted into the projectile in addition to a RF transmitter/receiver. The launcher is also fitted with a RF transmitter/receiver 69. The projectile sends the raw data collected by the digital camera to the launcher via radio signals 66. The launcher receives those radio signals and completes the necessary CPU processing. It then sends those calculations back to the projectile via radio signals 66 and the projectile's small capacity CPU 67 activates the actuators to steer or brake the projectile until the projectile is close enough to the target to deliver the payload, see FIG. 14. FIG. 15 shows the netting payload 42 inside the projectile 12 with the drone 38 nearby. FIG. 18 shows the projectile in the different phases of flight 44, 45, 46, 47, 48 as it leaves the barrel and nears the human target 12. FIG. 17A and FIG. 17 B shows the process flow of the flight of the nonlethal projectile. Box 50 starts the processing logic. Human aims the launcher in Box 51. Human fires the launcher in Box 52. Box 53 the projectile is turned on. Box 54 the camera sees images. Box 55 to 57 the processor determines if a human image is detected referencing the image dataset. If the human image is not seen, Box 59, then air brakes are activated, and projectile turns off in Box 61. If the projectile is close enough using distance algorithm in Box 58 then velocity algorithm in Box 60 determines if projectile is going too fast and activates air brakes in Box 62. If projectile is not going too fast, then payload is activated in Box 48 and target is disabled in Box 63. If projectile is not close enough to the target, then the tracking algorithm in Box 64 determines if projectile is off target and targeting algorithm adjusts fins to correct projectile in Box 65.

| | NUMBERS LIST |
|---|---|
| 1. | Outer Shell |
| 2. | Microcontroller CPU |
| 3. | Battery/Ultra Capacitor |
| 4. | Digital Camera |
| 5. | Accelerometer |
| 6. | Grid Fins/Air Brakes |
| 7. | Payload Actuator |
| 8. | Front Head |
| 9. | Primary Payload |
| 10. | Fin/Air Brake Actuator |
| 11. | Back Plate |
| 12. | Non-Lethal Projectile |
| 13. | Human Far Away |
| 14. | Human Close Up |
| 15. | Fixed Field of View |
| 16. | Secondary Payload |
| 17. | Front Head Open |
| 18. | Payload Thrust Vector |
| 19. | Reverse Thrust Vector |
| 20. | Acoustic Generator |
| 21. | Sound Openings |
| 22. | Sound Waves |
| 23. | Electroshock Generator |
| 24. | Electrodes |
| 25. | Electrode Ports |
| 26. | Electrode Wire |
| 27. | 40 mm Smart Bullet |
| 28. | 18 mm Smart Bullet |
| 29. | Triangular Fins/Air Brakes |
| 30. | Launcher Barrel |
| 31. | Projectile in Barrel |
| 32. | Projectile Outside Barrel |
| 33. | Object Recognition and Tracking Window |
| 34. | Bullet Tracking Motion |
| 35. | Flat Plate Fins/Air Brakes |
| 36. | Triangular Fins/Air Brakes at 90° Position |
| 37. | Launcher |
| 38. | Small UAV/Drone with Props |
| 39. | Projectile in Flight Timeline |
| 40. | Flat Plate Fins/Air Brakes at 90° Position |
| 41. | Projectile Tracking Target |
| 42. | Netting Payload |
| 43. | Radio Frequency RF Generator |
| 44. | Bullet in Object Recognition Mode |
| 45. | Bullet in Distance and Tracking Mode |
| 46. | Bullet in Distance, Tracking and Velocity Mode |
| 47. | Bullet at Correct Distance, Velocity and On Target |
| 48. | Payload Activated |
| 49. | Radio Frequency RF Receiver |

| NUMBERS LIST | |
|---|---|
| 50. | Flow Chart Start |
| 51. | Operator Aiming the Launcher |
| 52. | Operator Firing the Projectile |
| 53. | Projectile Turns ON |
| 54. | Camera Sees Images in Field of View |
| 55. | Object Recognition Using Image Dataset |
| 56. | Image Dataset |
| 57. | Human or UAV in View? |
| 58. | Distance Measuring Algorithm |
| 59. | Air Brakes Activated for Full Stop |
| 60. | Velocity Measuring Algorithm |
| 61. | Projectile Turns OFF |
| 62. | Air Brakes Activated to Slow Down |
| 63. | Target Disabled |
| 64. | Target Tracking Algorithm |
| 65. | Adjust Fins to Change Direction |
| 66. | Two-way Radio Signals |
| 67. | Mini-CPU |
| 68. | CPU with Maximum Processing Power |
| 69. | Radio Transmitter and Receiver |
| 70. | Fins/Air Brakes Rotated 45° |
| 71. | Human |

While a number of exemplifying features and embodiments have been discussed above, those of skill in the art will recognize certain modifications, permutations, additions and sub combinations thereof. No limitation with respect to the specific embodiments disclosed herein is intended or should be inferred.

The invention claimed is:

1. A non-lethal projectile to deter a human, the non-lethal projectile comprising:
    a housing designed for propulsion from a barrel;
    said housing having a forward-facing camera equipped to sense a wavelength of light;
    said forward facing camera feeding a real time signal to a processor;
    said processor having an image recognition database which enables a recognition of a human;
    a distance to target means functioning to determine when the target is a selected distance from the projectile; and sending a trigger notice to the processor when the selected distance is reached;
    an on board actuator having a means to release a non-lethal payload from the housing;
    said processor triggering the onboard actuator when the distance is reached;
    said non-lethal payload selected from the group consisting of gas, gel, liquid, powder, sound waves, light waves, electro-magnetic waves and electric projectiles;
    said non-lethal payload providing a thrust vector in an opposite direction from a direction of travel of the non-lethal projectile, thereby slowing the housing upon the triggering of the onboard actuator;
    said housing having a steering fin controlled by the processor using a human image signal from the camera to guide the non-lethal projectile to the human; and
    wherein a braking fin is actuated by the processor to substantially stop any part of the housing from hitting the human.

2. The non-lethal projectile of claim 1, wherein the distance to target means further comprises an active energy transmitter and receiver.

3. The non-lethal projectile of claim 1, wherein the distance to target means further comprises a ratio of a size of camera image of a human in relation to a background size of the camera.

4. The non-lethal projectile of claim 3, wherein the ratio ranges from about 80 to about 90 percent.

5. The non-lethal projectile of claim 1, wherein the processor is on board the housing.

6. The non-lethal projectile of claim 1, wherein the on board actuator has a means to release a plurality of non-lethal payloads.

7. The non-lethal projectile of claim 1, wherein the housing self-destructs by force from the force from the onboard actuator upon its triggering.

8. The non-lethal projectile of claim 1, wherein the housing is designed to be discharged from a firearm.

9. The non-lethal projectile of claim 8, wherein the processor is in the firearm.

10. The non-lethal projectile of claim 1, wherein the housing is designed to be discharged from a gas discharge weapon.

11. The non-lethal projectile of claim 10, wherein the processor is in the gas discharge weapon.

12. The non-lethal projectile of claim 1, wherein the selected distance from the projectile ranges from about two feet to about five feet.

13. The non-lethal projectile of claim 1, wherein the housing further comprises a frangible front head.

14. The non-lethal projectile of claim 1, wherein the electric projectiles carry an electric charge supplied by a capacitor or a battery on board the housing.

15. A non-lethal projectile to disable a drone, the non-lethal projectile comprising:
    a housing designed for propulsion from a barrel;
    said housing having a forward-facing camera equipped to sense a wavelength of light;
    said forward facing camera feeding a real time signal to a processor;
    said processor having an image recognition database which enables a recognition of a drone;
    a distance to target means functioning to determine when the target is a selected distance from the projectile;
        and sending a trigger notice to the processor when the selected distance is reached;
    an on board actuator having a means to release a non-lethal payload from the housing;
    said processor triggering the onboard actuator when the distance is reached;
    said non-lethal payload selected from the group consisting of electro-magnetic waves, and netting;
    said non-lethal payload providing a thrust vector in an opposite direction from a direction of travel of the non-lethal projectile, thereby slowing the housing upon the triggering of the onboard actuator;
    said housing having a steering fin controlled by the processor using a drone image signal from the camera to guide the non-lethal projectile to the drone; and
    wherein a braking fin is actuated by the processor to substantially stop any part of the housing from hitting the drone.

16. The non-lethal projectile of claim 15, wherein the distance to target means further comprises an active energy transmitter and receiver.

17. The non-lethal projectile of claim 15, wherein the distance to target means further comprises a ratio of a size of camera image of a drone in relation to a background size of the camera.

18. The non-lethal projectile of claim 15, wherein the processor is on board the housing.

19. A non-lethal projectile designed to be discharged from a barrel, the non-lethal projectile comprising:

a housing having a forward-facing camera which feeds a real time signal to an on board processor;

said on board processor having a target recognition database and a range finding algorithm;

an actuator in the housing that discharges a payload upon command from the processor based on a proper target recognition and a selected range to target;

said payload providing a force vector opposite a direction of travel of the housing so as to slow down the housing;

said housing having a steering fin controlled by the processor to slow down the housing upon command from the processor.

20. The non-lethal projectile of claim 19, wherein the payload is selected from a group consisting of a gas, a gel, a powder, a sound wave, a light wave, an electromagnetic wave, an electrode, and a net.

* * * * *